United States Patent [19]

Roberts

[11] Patent Number: 4,505,016

[45] Date of Patent: Mar. 19, 1985

[54] METHOD OF MANUFACTURING A DIE-CAST WOBBLE PLATE ASSEMBLY

[75] Inventor: Richard W. Roberts, Lombard, Ill.

[73] Assignee: Borg-Warner Corporation, Chicago, Ill.

[21] Appl. No.: 509,638

[22] Filed: Jun. 30, 1983

[51] Int. Cl.³ .................. B23P 15/10; B22D 17/00; B22D 19/12

[52] U.S. Cl. .................. 29/156.5 R; 29/156.4 R; 29/527.3; 29/527.6; 29/DIG. 10; 29/DIG. 26; 74/60; 164/75; 164/98; 164/100; 164/111; 164/112; 417/269

[58] Field of Search .................. 29/156.5 R, 156.5 A, 29/527.3, 527.6, DIG. 10, DIG. 26, 156.4 R; 74/60; 164/75, 98, 100, 111, 112; 417/269, 270, 271, 272, 273

[56] References Cited

U.S. PATENT DOCUMENTS

| 1,680,705 | 8/1928 | Thomson | 174/194 |
|---|---|---|---|
| 2,076,971 | 4/1937 | Soulis et al. | 22/126 |
| 2,361,046 | 10/1944 | Molly | 29/156.5 A |
| 2,464,050 | 3/1949 | Morin | 18/59 |
| 2,743,517 | 5/1956 | Everett | 29/528 |
| 3,384,949 | 5/1968 | Morin | 29/430 |
| 3,535,986 | 10/1970 | Daub | 92/228 |
| 3,763,535 | 10/1973 | Gallagher | 29/149 |
| 3,786,543 | 1/1974 | Sato | 29/149 |
| 4,062,395 | 12/1977 | Sirmay | 164/9 |
| 4,270,255 | 6/1981 | Klimek | 29/156 |
| 4,453,300 | 6/1984 | Klimek et al. | 29/156.5 A |

FOREIGN PATENT DOCUMENTS 2045121 10/1980 United Kingdom .......... 29/156.5 R

Primary Examiner—Charlie T. Moon
Assistant Examiner—Ronald S. Wallace
Attorney, Agent, or Firm—Florian S. Gregorczyk

[57] ABSTRACT

An improved method of manufacturing a swash plate assembly for use in a compressor, fluid motor or similar device in which a plurality of pistons are connected, by means of connecting rods, to a swash plate which drives (or is driven by) the pistons. A plurality of piston and rod assemblies are made by casting the piston around one end of a connecting rod which is formed with a ball at both ends, thus providing a ball-socket connection therebetween. The pistons are finish machined. A die-insert is utilized to locate the ball and rod prior to casting, and is thereafter moved along the rod to contact the other ball end. This insert thus serves to locate the rod section with the affixed piston in a mating socket of a swash plate die. The swash plate is cast about a plurality of such piston bearing rods to a carefully toleranced dimension. The swash plate end of the assembly is then finish machined.

3 Claims, 5 Drawing Figures

METHOD OF MANUFACTURING A DIE-CAST WOBBLE PLATE ASSEMBLY

BACKGROUND OF THE INVENTION

1. Field of the Invention

A method of manufacturing a wobble or swash plate assembly by a die-cast method.

2. Description of the Prior Art

The prior art is replete with techniques for the casting of metals, ceramics and plastics into various parts including ball and socket arrangements. These castings are frequently two element parts, such as a socket member cast about a ball so that the socket retains the ball and is movable about the ball. However, the use of die inserts to fix the relative location of such sockets in a multipart ball and socket assembly is not well known.

The casting of a fused quartz (ceramic) insulator about a ball-headed rod is disclosed in U.S. Pat. No. 1,680,705 to Thompson. A bimetal piston arrangement is taught in U.S. Pat. No. 2,076,971 to Soulis et al., wherein an aluminum head is cast about a precast body and wrist pin of iron or steel. However, neither of these patents nor their combined teachings illustrate the casting of a piston and swash plate assembly at opposte ends of a spherical ended rod to provide relative rotatable motion to the rod.

A method of casting end steps on a zipper utilizing a closed die is illustrated in U.S. Pat. No. 2,464,050 to Morin. The zipper stringer is merely placed in the die without locating means and the casting is made about such zipper stringer. A die insert for use in the casting of hypodermic needle assemblies is shown in U.S. Pat. No. 2,743,517 to Everett, but such castings are fixed members and are not required to flex, twist, turn or move. U.S. Pat. No. 3,384,949 to Morin discloses a method to cast a multiple part end product which may rotate around an axis perpendicular to the plane of rotation. However, the accummulated or individual teachings of these patents do not show a method of casting a double ended rod with a ball and socket arrangement cast at each end thereof.

Various disclosures teach the casting of a piston and wrist pin such as the Soulis et al. '971 patent above and the U.S. Pat. No. 3,535,986 to Daub which utilizes a die insert to control the sirt diameter of a piston. The teaching of a ball and socket cast piston is illustrated in U.S. Pat. No. 3,763,535 to Gallagher, however, this patent only teaches this piston and connecting rod assemblage. This use of die inserts for the production of rods with ball ends or movable means is further demonstrated in U.S. Pat. No. 3,786,543 to Sato wherein a spherical element coated with a resin film is set in a die and secured in position therein against such inserts. After the die is closed, a connecting rod is cast about this spherical element and upon its removal the spherical element is freely rotatable in the connecting rod. The rotatable element in Sato '543 is not free to pivot about the race into which it is cast, and the cast piston in the patent to Gallagher '535 is again just a ball ended connecting rod cast into a piston. Further, Gallagher '535 requires the cast metal to be at a pressure which will provide the required clearance between ball and piston socket.

The casting of complex or multipart assemblies in one operation is demonstrated in the U.S. Pat. No. 4,062,395 to Sirmay, but the patent discloses a complex die and finished part within a single die. A multipart casting is also taught in the U.S. Pat. No. 4,270,255 to Klimek wherein two separate parts are cast about ball ended and matable rods or tubes. In this patent a piston is cast about one rod or tube ball end a swash plate is cast about the opposite rod or tube ball end. Each part is individually machined. These tube and rod means are then mated and the final distance between such swash plate and piston is fixed by the joining by welding of the mating rods.

SUMMARY OF THE INVENTION

This invention relates to a new and improved method of manufacturing, by casting, a swash plate and piston assembly which includes a plurality of pistons connected to the swash plate. Axial motion is transmitted to the pistons by the nutating motion of the swash plate. If the assembly is to be used in a fluid motor, the reciprocating motion of the pistons would drive such swash plate.

The basic manufacturing steps of this process include:

1. fabrication of the plurality of piston or connecting rods, each rod having a dumbbell-like shape with ball ends thereon;
2. positioning a split die insert on each of said rods in a position to abut one of the ends of the connecting rods, which insert is slidable on the connecting rod;
3. positioning the ball and die insert in a casting die;
4. casting the plurality of pistons wherein each piston encircles one of said ends of the connecting rods at the end against which the slidable insert abuts, and finish machining the pistons after solidification;
5. sliding said inserts to contact the other ball ends of the rods;
6. providing a swash plate die defining complementary sockets wherein the other ball end of each rod is located in a complementary socket;
7. casting a swash plate about said complementary end sockets; and,
8. machining the swash plate component of said piston and swash plate assembly to predefined dimensions.

DETAILED DESCRIPTION OF THE INVENTION

Figure 1:
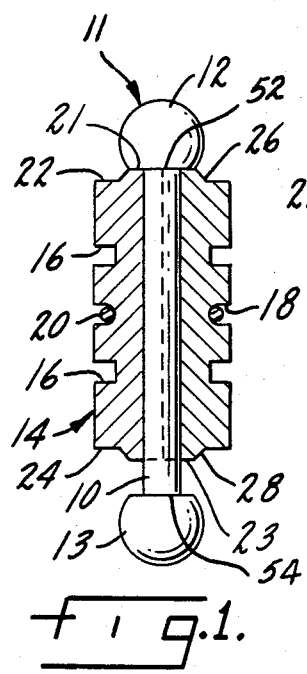
FIG. 1 is a plan view of a rod with ball ends mounted thereon and a cross-section of the die insert positioned about said rod.

The present invention provides a method of conveniently and accurately casting a piston and wobble or swash plate assembly with ball and socket connecting joints. Ball and socket assemblies are used extensively to allow combinations of axial, rotational and orbital movements in machinery. Such machinery components include pistons, drive plates and crank shafts in pumps and compressors, actuating toggles for presses and punches, connecting rods and assemblies in conveyor systems. They are suitable for use in swash plate assemblies as described in the present specification.

There are other methods for constructing such swash plate assemblies. An example of such other methods is shown in the U.S. Patent to Klimek U.S. Pat. No. 4,270,255 wherein the wobble plate is cast about a piston rod and ball, and a piston is cast about a ball and hollow rod section. The rod sections are thereafter joined together to produce the finished assembly and welded in position to a final dimension length. Each of these subassemblies require separate casting and these subassemblies must be accurately located and then welded.

To produce strong assemblies capable of withstanding repeated heavy loads or to produce precise assemblies with a controlled or minimum movement or play between the ball and socket requires a maximum amount of conformity of the ball to the socket. This degree of conformity in a machined and assembled part requires large deformation of the socket material, is time consuming and necessitates expensive procedures and equipment. The optimal "fit" also demands a large degree of deformation of the socket material which by necessity may require the use of a soft, weak material that might result in cracking or stresses which act to weaken the assembly.

The high pressure to deform the walls of an aperture to conform a ball to a socket require that the ball be made of a high strength material that will resist crushing during formation. This strength requirement limits the selection of ball materials with possible penalties in desired properties or economy.

Aside from the problem cited above, high pressures are needed to form but do not assure full conformity of the socket to the spherical surface of the ball. As a result of incomplete forming, and also because of wrinkling and buckling of the deformed materials, the applied loads are not uniformly distributed over the spherical surface of the ball. This results during use in concentrated loads which cause overloading and failure. Load concentrations also cause excessive wear on contact points which wear increases the amount of relative movement in the socket further complicating loading and thereby leading to premature failure.

Any and all of the methods of assembling a ball and socket are such that precise dimensions of the assembly are difficult to maintain. In many applications two or more ball socket joints are connected to form a piece of machinery. Final dimensioning of such machinery or apparatus must be performed by machining of an unwieldy assembly.

In many of the mechanical forming processes, a spacer material or coating on either the ball or components is employed to assure that a specified or some amount of relative movement will exist between ball and socket if only to assure free movement. The spacers must be removed by dissolving, heating or by mechanical means.

Other methods of forming the ball and socket assembly include the use of inserts which prevent the escape of the ball from the socket. Another ball and socket forming technique requires machining spherical apertures into two separate sections and then connecting the separate sections after enclosing the ball. The final connections could be made by fasteners, springs, brazing, etc.

A preferred method for manufacture of ball and socket junctions includes the technique of inserting the ball and its appendages during manufacture of the socket by molding of liquid, super plastic, powdered metals, polymer compounds, and preferably by die-casting of molten metal, such as aluminum.

The pistons of a variable displacement pump, compressor or fluid motor are attached to a driving plate by connecting rods. The movements of both the pistons and drive plate require the flexibility of a ball and socket junction. The assembly can contain a multiple number of pistons attached to the swash plate. The pistons must be machined for overall dimensions, contouring of ring grooves on the OD of said pistons and piston head surfaces. On the other hand, the swash plate must be machined on the bottom and ID surfaces for contour and flatness. The final assembly of pistons and swash plate must be dimensioned to a tolerance of 0.001–0.002" in final length. Therefore, it is desirable to provide a means to finish machine the final assembly. Further, it is desirable to cast the ball or pistons and swash plates about the ball members on the connecting rods as a major economical measure.

Figure 2:
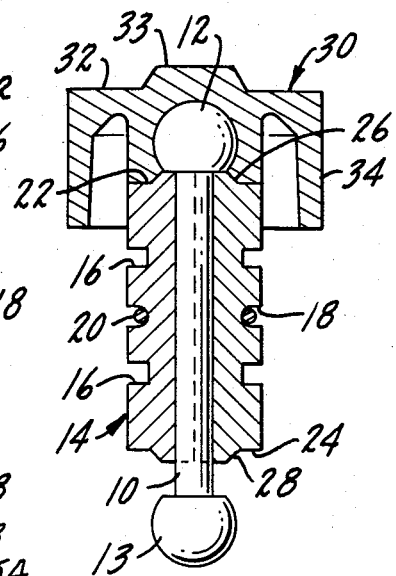
FIG. 2 is a cross-section of a piston and skirt cast about one end of the rod section as in FIG. 1.

Referring to the drawings and particularly to FIGS. 1 and 2, a rod 10 with first end 52 and second end 54 is shown with prefabricated spherical first and second ends or balls 12 and 13 positioned at the ends of rod section 10 to produce a dumbell-like rod 11. Mounted about rod section 10 is a split die insert 14 consisting of two halves. Die insert 14 defines locating grooves 16 and a rataining groove 18. Positioned in groove 18 is a holding ring 20 to secure split die insert 14 on rod section 10. Grooves 16 may also be utilized for a retaining or holding ring but they are utilized to locate a part or position in a die-casting operation as known in the prior art. Die insert 14 defines a first flat 21 and a second flat 23 extending beyond ends 22 and 24, respectively. First end 22 and second end 24 cooperate with flats 21 and 23, respectively, to define sloped shoulders 26 and 28, therebetween.

Die insert 14 is slidable along rod 10 to engage flat 21 or flat 23 against one of said ball ends 12, 13, respectively and is secured thereto by a ring or wire or other means 20 as known in the art. Rod 10 with die insert 14 positioned against one of ball ends 12, 13 is positioned with the ball and die insert 14 in a die-casting or other type of casting mold not shown but known in the art. A piston or piston head 30 is cast about ball end 12, 13 which is located in position utilizing locating grooves or slots 16. Piston head 30 defines a top 32, crown 33 and a skirt section 34.

Figure 3:
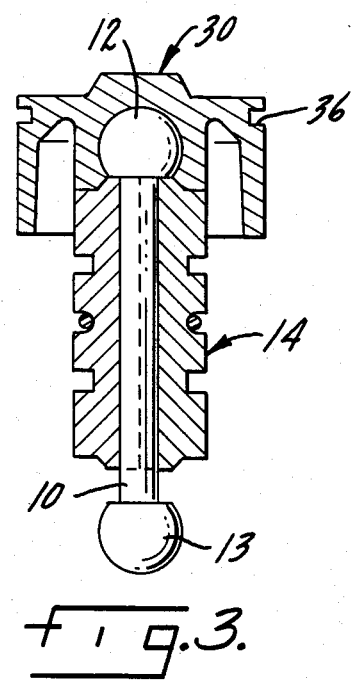
FIG. 3 illustrates the piston and rod assembly of FIG. 2 with piston skirt, piston crown and ring groove finish machined thereon.
Figure 4:
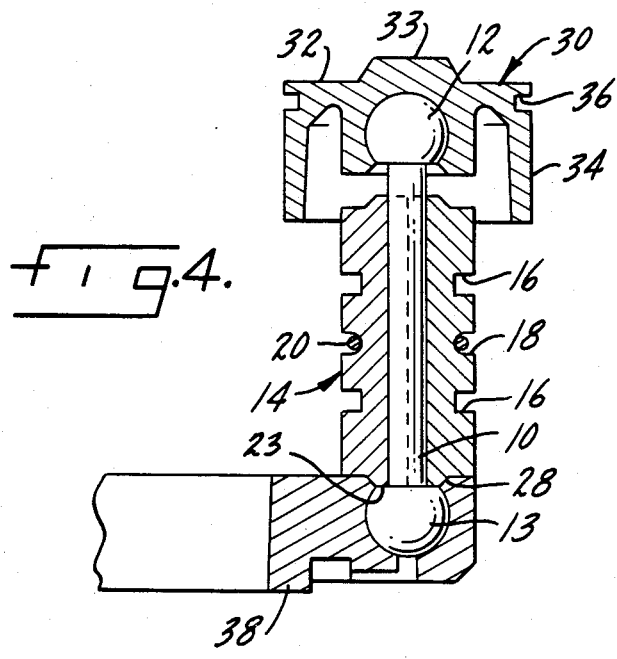
FIG. 4 illustrates a wobble plate cast about the other end of a rod and piston as shown in FIG. 3.

Finish machining operations are performed on piston head 30 after casting, such as machining ring grooves 36 shown in FIG. 3. Thereafter, insert 14 is moved or slid along rod section 10 to contact the other ball end 12, 13 against flat 23 of insert 14. Die insert 14 contacts ball end 13 at flat 23 as shown in FIG. 4. A swash plate die is provided, which die (not shown) defines complementary sockets to receive ball end 13 for casting a swash plate 38 with a bottom 40 and a cast metal socket about ball end 13. The slot or groove 16 of insert 14 is used to locate or define the distance between swash plate 38 and end 24 or flat 23. This distance is a predetermined distance for a part.

Following solidification of the swash plate 38 retaining means 20 is removed from slot 18 and die insert 14 is removed from rod section 10.

In this configuration the plurality of rod 10 and piston head 30 assemblies are now connected to a swash plate 38 in complementary sockets. The finished assembly may now be machined to final dimensions, that is, the distance between the swash plate assembly bottom 40 defined by swash plate 28 and the piston top 32 or crown 33.

The foregoing describes the completed swash plate and piston assembly, and broadly describes the manufacture of such assembly. The following preferred procedure details such manufacture:

(1) Ball ends 12 and 13 are joined to a section of rod or tubing 10 of the correct final length. The ball and stem assembly so formed is coated with a mold-release agent and heated (300°–400° F. approximately) to drive off any volatiles in the coating, to preheat the ball, and stress relieve any weldment or other joining method utilized on the ball.

(2) The die insert 14 is placed about said rod section 10 and positioned against one of the ball ends 12, 13. The coated, preheated ball and stem assembly is placed into the cavity of a die-casting machine such as described in U.S. Pat. No. 3,763,535. The die is located in relation to die insert groove 16. The mold is closed and a casting made as per conventional die-casting procedures. This casting is a casting of the piston head and crown with or without a skirt. The piston casting can be finish machined after removal from the die.

(3) Thereafter, the die insert 14 is slid or moved along rod section 10 to contact the other of the ball ends and this insert and ball end with the cast piston head 30 at the opposite end is positioned in a die defining a complementary socket of a swash plate. The ball end is located in the die in relation to shoulder 28 and locating groove 16.

(4) The swash plate with complementary sockets is cast about the plurality of ball ended rods and is ejected from the mold following solidification.

(5) The piston and swash plate assembly or casting is placed into a fixture (not shown) which holds the components in proper position to allow final machining of the swash plate assembly to fix the total length of this assembly within required dimensions.

This finished structure is ready for use. It can consist of as many rod and piston sections as required for its general use but usually consists of at least three pistons and rods cooperating with the swash plate.

The manufacture of the assembly could be performed with several variations. The following variation of materials and processes illustrate the scope of the method without limiting the method to these examples. The materials of construction and method of manufacture of the balls can be of any type as currently available or practiced, or of any special type with specific physical properties as needed for a particular application. These special properties could include strength, wear or corrosion resistance or magnetic properties. Further, the materials, could be hard or soft steel, cast irons, copper or aluminum base alloys or non-metallic balls could be used as desired for properties or economy. The ball or balls can be made integral with, or attached to the connecting rod section or any appendage by soldering, brazing, resistance or fusion welding, adhesives or by any mechanical means such as screw threads. A single piece ball and stem unit is thereby produced and useable in this casting technique.

The connecting rod or appendage can be made of any material or process to provide the properties and/or economy required in this assembly. As an example, the rod and ball ends could be produced by cold heading, swaging, machining, casting or any other process known for use in the shaping of materials. The connecting rods could be made of a solid rod or bar, or tubing. Regardless of the method of manufacture the connecting rod and ball assembly should be of a finished dimension to allow casting of the head piston 30 and swash plate 38. After casting this assembly adequate material is available to finish machine this assembly to its final dimension.

Coatings applied to the ball sections prior to molding into the socket may be of a variety of materials and thicknesses as required for properties and economy, or to be compatible with the process or materials selected for ball-socket manufacture. As an example, hardened steel balls such as used for ball bearings, may be resistance welded to low carbon steel tubing and thereafter coated by dipping or spraying with an alcohol or water suspension of finally divided graphite. Upon drying at 400° F. for sufficient time to evaporate all of the alcohol, the entire ball and stem assembly is heated to stree relieve the welds, and the ball will thereafter be coated with a film or residue of graphite. Similar suspensions in water, alcohols or other suspending mediums could be used to deposit films of molybdenum disulfide or other solid lubricants. The coating could be produced by dipping or spraying of polymeric materials of the polyethylene or polybutadiene types which will carbonize without producing large volumes of vapor upon contact with liquid metal or any source of high temperature and thus provide a separating film between the ball and socket to assure free motion.

The coating materials depicted or described above are provided to prevent the sticking of a ball and socket materials by producing an interference film between the ball and socket. The thickness of the interference film may be controlled by formulation or by repeated coating to provide a positive or specified clearance as required. Ideally, the coating material would also serve as a lubricant or initial wear-in component in the system, as with graphite or carbonized polymer coatings. The selection of the coating material will be dependent on the variables of the assembly including materials, molding process, service conditions, etc. As a further example of such selection, a steel ball when inserted into an iron socket casting could be coated with a sodium silicate material that will break up and act as a wear-in abrasive in the joint. Further, a steel ball molded in an aluminum powder compact socket could be coated with a phosphate conversion coating for separation and initial wear-in.

The degree of preheating of the coated ball will be determined by several factors, including the coating in the molding process itself. As an example, volatile binders and vehicles in the coating must be driven off to prevent large quantities of gas in the mold during molding.

In the description of the casting method of the present invention the means for holding the slidable insert described is a clip, spring or wire. However, if required, such holding means could include adhesives, magnetics or other means.

The molding process for forming a socket and casting the piston head described, as well as the swash plate, has been described particularly for use with a die-casting operating. However, the use of such die-casting process in this example for producing pistons and swash plates or drive plates, was selected on the basis of production quantities (economy) and the type of material required in the piston and plate. These two parts could be made of an aluminum alloy number 380. Any other aluminum base alloy compatible with the die-casting process and with the required chemical and mechanical properties of the part and having suitable bearing and wear properties could also be used. Magnesium and zinc base diecasting alloys could be used if economy or property requirements allow demand. Therefore, any metal casting process could be used, such as a sand mold, however, these are not deemed to be as economical as the preferred embodiment.

The design of the socket is not necessarily limited to containment about the entire periphery of the ball but could be partially slotted to allow greater travel in one or more directions.

Socket manufacture encompassing the present method need not be limited to metals or the casting of liquid metals. The ball inserts as described can be contained in compacted metal powders and processed in the manner known to those familiar with the art for treating metal powder compacts to achieve required properties. The socket could be manufactured by molding or casting of polymeric materials according to procedures well known to those familiar with that casting art.

The design or function of the socket is not particularly limited to the piston and drive ring taught in the example but could be of any shape required. Such a shape would be dictated by the shape of the sloped shoulder 26, 28 on such sliding insert 14.

Figure 5:
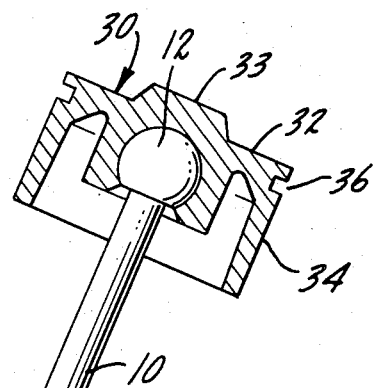
FIG. 5 illustrates a piston, rod and wobble plate assembly as finish machined.
Figure 5:
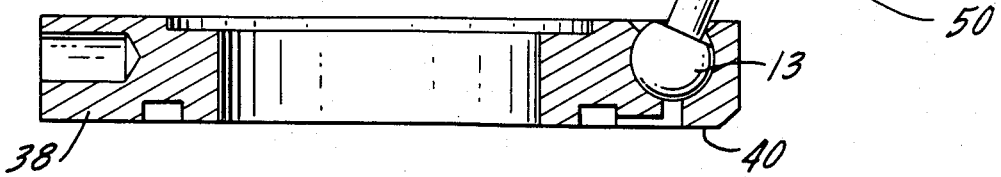

The pistons 30, as noted above are mentioned prior to casting the swash plate 38 at the rod end opposite the piston. The casting of the swash plate 38 about the second ball end to define a piston and swash plate assembly 50 as in FIG. 5 allows a final dimension to be predetermined, that is, the height between the swash plate and the piston crown, as well as surface and bore relationships. This single final machining eliminates the need to microfinish the surfaces, and fixes the angular and parallel surface relationships. Such single operation relationships are far easier to obtain than are multiple machined surface positions.

While this invention has been described in connection with certain specific embodiments thereof, it is to be understood that this is by way of illustration and not by way of limitation; and the scope of the appended claim should be construed as broadly as the prior art will permit.

I claim:

1. A method of manufacturing a piston and swash plate assembly, comprising the steps of:
   (1) fabricating a plurality of dumbelllike connecting rods, each having a rod, a first ball end and a second ball end;
   (2) positioning a split insert on each of said rods, in a position abutting said first end of each of said the connecting rods;
   (3) casting a plurality of pistons, with each piston encircling one of said first ends of the connecting rods to allow relative movement therebetween;
   (4) providing a swash plate die defining complementary sockets, positioning said second ends of the connecting rods in said sockets, and moving said insert to abut said second end of each connecting rod;
   (5) casting a swash plate about said second ends to allow relative movement therebetween; and
   (6) machining said piston and swash plate assembly to predefined dimensions.

2. A method of manufacturing a swash plate and piston assembly, comprising the steps of:
   (1) fabricating a plurality of dumbelllike connecting rods, each having a rod of a predetermined overall length, each rod terminating in a first ball-shaped end and a second ball-shaped end;
   (2) mounting a plurality of split inserts, each encircling one of said connecting rods, each insert defining locating grooves and abutting one of said ball-shaped ends;
   (3) casting a plurality of pistons so that one piston encircles the one of said ball-shaped ends which abuts the insert, and utilizing said grooves in defining the height of said piston;
   (4) moving said inserts along said rods to a second position, abutting the other of said ball-shaped ends, and securing each insert in said second position;
   (5) providing a swash plate die which defines a plurality of complementary socket positions;
   (6) positioning said other ball-shaped ends in the respective complementary socket positions, and utilizing said grooves to mark the position of said other ball-shaped ends in said complementary sockets;
   (7) casting said swash plate to retain said other ball-shaped ends; and
   (8) machining said swash plate and piston assembly to predetermined dimensions.

3. A method as claimed in claim 2 wherein said as-cast pistons define a crown and skirt, said crown and skirt being machined prior to positioning said other ball-shaped end in said swash plate die complementary socket.

* * * * *

UNITED STATES PATENT AND TRADEMARK OFFICE
CERTIFICATE OF CORRECTION

PATENT NO. : 4,505,016

DATED : March 19, 1985

INVENTOR(S) : RICHARD W. ROBERTS

It is certified that error appears in the above—identified patent and that said Letters Patent is hereby corrected as shown below:

Column 8, line 1, cancel "dumbelllike" and insert -- dumbell-like --.

Signed and Sealed this

Thirteenth Day of August 1985

[SEAL]

Attest:

DONALD J. QUIGG

*Attesting Officer*  *Acting Commissioner of Patents and Trademarks*